UNITED STATES PATENT OFFICE.

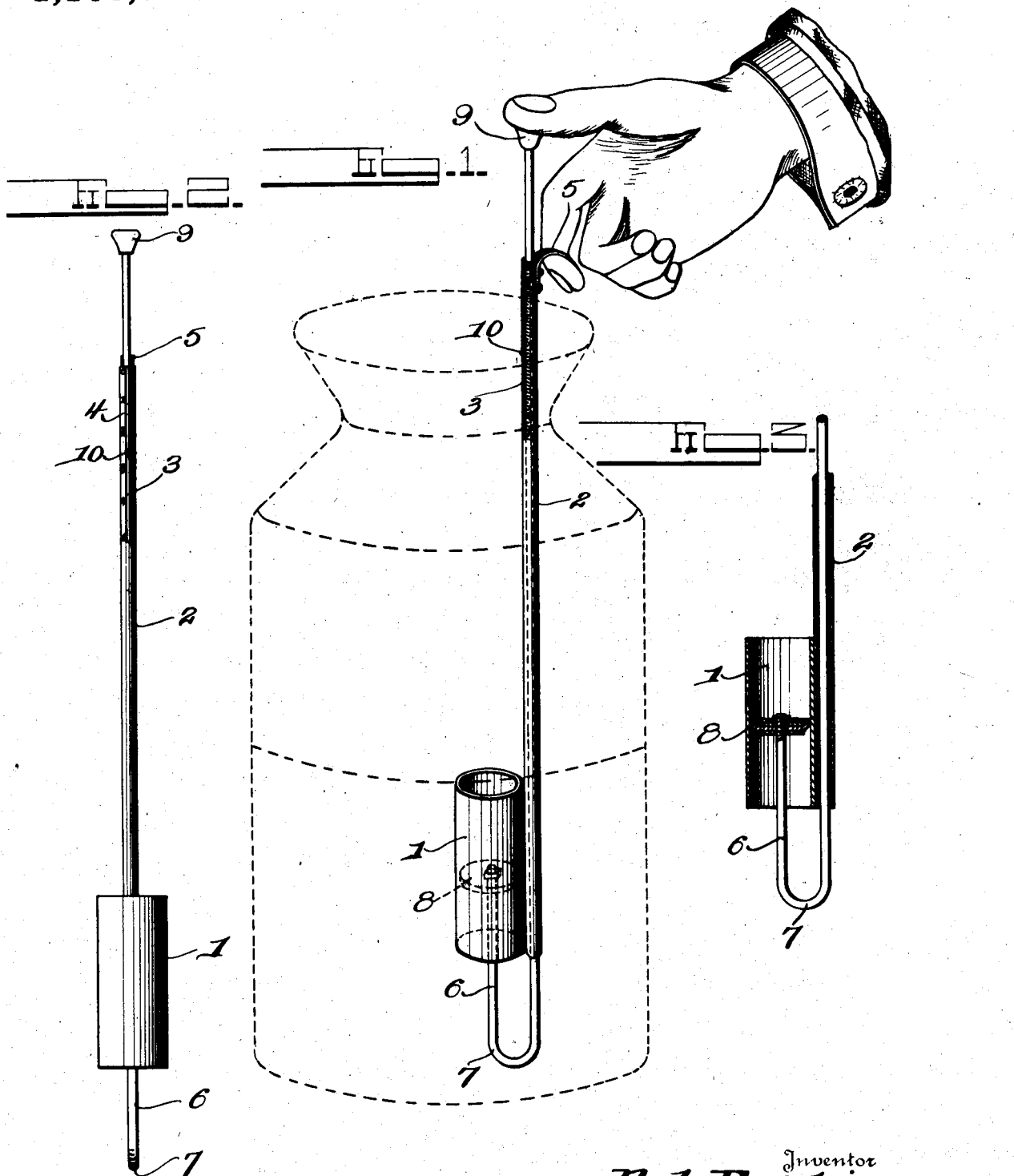

NELS ERICKSON, OF COON VALLEY, WISCONSIN.

DEVICE FOR SAMPLING MILK OR CREAM.

1,108,561.  Specification of Letters Patent.  Patented Aug. 25, 1914.

Application filed February 18, 1914. Serial No. 819,364.

*To all whom it may concern:*

Be it known that I, NELS ERICKSON, a citizen of the United States, residing at Coon Valley, in the county of Vernon and State of Wisconsin, have invented certain new and useful Improvements in Devices for Sampling Milk or Cream, of which the following is a specification.

My invention relates to improvements in devices for taking milk or cream samples, or more plainly speaking, to what may be termed a gaged sampling cup for taking samples of milk or cream in proportion to the quantity delivered each time where testing is not done at each delivery.

The main object of my invention is the provision of a device of the simplest and cheapest possible construction, which will permit of taking proportional samples of the milk or cream at each delivery by establishing test sample units, to ascertain the exact amount of butter fat in the milk or cream delivered during the interval between two successive tests.

Another object of my invention is the provision of a device adapted to be inserted into the milk or cream and which will gage the quantity each time a sample is taken, according to established units, so that the final test sample will involve both quantity and quality of the total amount delivered during the interval between two consecutive tests, thus eliminating great shortcomings of the methods now employed, and providing a safeguard which will insure an accurate test instead of an uncertain and inaccurate average, and thus produce a device which will prove useful upon a farm or in connection with creameries or cheese factories.

With these objects in view, my invention broadly stated consists of an open cup or receptacle adapted to be inserted in the milk or cream, a scale disposed in proper relation to said cup, and a piston operating in the cup and having a plunger operated by the finger and having an indicator acting in connection with the scale.

This invention further consists of a device of the character and for the purpose stated, embodying novel features of construction, combination and arrangement of parts for service, substantially as shown, described and claimed.

In order that the detailed construction and operation of my device may be readily understood and its many advantages be fully appreciated, I have illustrated in the accompanying drawing a sampling cup, constructed in accordance and embodying my invention.

Figure 1 represents a perspective view of my device showing the manner of using. Fig. 2 represents a side elevation, and Fig. 3 represents a sectional view of the cup and piston of my device.

The device is of extremely simple construction and consists of the open sleeve forming the cup 1, the tube 2, rising from one side of the cup, formed at its upper end with a slot 3, and scale 4, having a finger receiving loop 5, and the piston rod 6 formed with the elbow 7, and carrying at its end the piston 8, said piston rod being formed with a thumb engaging button or head 9, and carrying the pointer or indicator 10, which operates in conjunction with scale 4.

The cup and scale are of the same length in order that the amount of milk or cream which enters the cup by proper adjustment of the piston, will represent units on the scale which are proportional to the quantity of milk or cream delivered, and when the desired sample has been taken, it is poured into the customer's test sample bottle and stored, for further test samples, that are taken in the same way and by the same standard unit, until the time comes for testing, which is done by the same method as heretofore.

It will thus be seen that I provide a simple, durable, and inexpensive device for taking milk or cream samples, where testing is not done as each sample is taken, which will insure an exact final test, and that the device can easily and readily be cleaned and sterilized, and thus prove a sanitary, efficient, and practical article for the purpose stated.

I claim:

A device for sampling milk or cream consisting of an open sleeve forming a cup, a tube rising from one side of said cup and having a slot and scale at its upper end of the same length as said cup, a finger loop at the upper end of said tube, a rod fitting in said tube and having its lower end passing upward into said cup, and having a thumb piece at its upper end and carrying a pointer guided in the slot of the tube and indicating upon said scale, and a piston carried by the lower end of said rod and fitting in said cup.

In testimony whereof I affix my signature in presence of two witnesses.

NELS ERICKSON.

Witnesses:
A. B. KNUDTSON,
E. B. KUNDTSON.